(No Model.)
J. SOLTER.
SHEET METAL CAN.
No. 244,683.          Patented July 19, 1881.
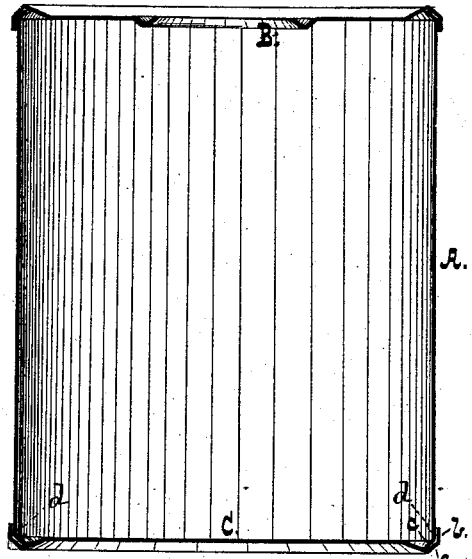
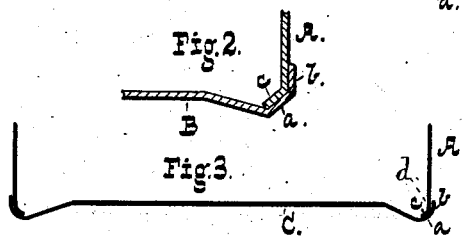
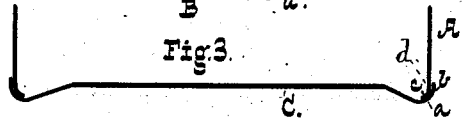
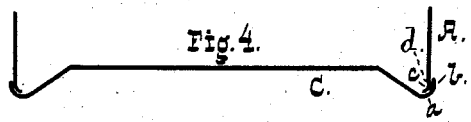
WITNESSES.
W. A. Bertram
DeL. H. Barclay
INVENTOR
John Solter.
BY
R. D. Williams
ATTORNEY.

UNITED STATES PATENT OFFICE.

JOHN SOLTER, OF BALTIMORE, MARYLAND, ASSIGNOR OF ONE-HALF TO GEORGE L. KREBS, OF SAME PLACE.

SHEET-METAL CAN.

SPECIFICATION forming part of Letters Patent No. 244,683, dated July 19, 1881.

Application filed May 20, 1881. (No model.)

*To all whom it may concern:*

Be it known that I, JOHN SOLTER, of Baltimore city, State of Maryland, have invented certain new and useful Improvements in Sheet-Metal Cans; and I hereby declare the same to be fully, clearly, and exactly described as follows, reference being had to the accompanying drawings, in which—

Figure 1 is a central sectional view of a can embodying my invention. Fig. 2 is a similar view, illustrating the head-seam on an enlarged scale. Figs. 3 and 4 are sectional views of a modified form of seam.

My invention has reference to seams for sheet-metal articles, such as ordinary provision-cans, cups, measures, &c.; and it has for its object to facilitate the attachment of the head to the body of the vessel.

In the conventional provision-can the body is cylindrical from end to end, and the head is provided with a rim-flange adapted to inclose the edges of the body. As conducive to economy of solder and to the security of the seam, a close fit of the walls or body within the head-flanges is sought to be attained, but such fit greatly increases the difficulty of placing the head upon the body preparatory to soldering the head-seam.

Various devices have been used for inserting the can-bodies within the flanges of the heads, consisting, essentially, of dies slightly smaller than the heads, through which dies the can-bodies are pressed into the heads. The objection to these devices lies mainly in the fact that the can-body is liable to be compressed by the dies to an extent that leaves, especially at the side seam of the body, an open joint in the head-seam, and in practice the advantage in point of time saved by the use of the dies is about neutralized by the slightly-increased expenditure of solder.

I have devised a can in which the heading of the same is greatly facilitated and, with no greater expenditure of solder, a stronger seam is formed than in the common can. I secure these important results by turning the edges of the can-body inward and crimping a flange on the rim of the head conforming in shape thereto and to the cylindrical walls of the can, and fitting closely to both, and my invention may be said therein to consist.

In the drawings, A is the can-body, and B and C are the heads. The ends of the body are slightly turned inward, as shown at *c*, either abruptly, as illustrated in Figs. 1 and 2, or in a curve, as seen in Figs. 3 and 4. The head-flange *a b* is stamped up, of a shape conforming to that of the edges of the body, and is cylindrical and of a diameter slightly exceeding that of the inclosed part of the can, the fit being close enough to hold the head upon the cylindrical part *d* of the can, while offering no obstacle to the insertion of the edges of the body within the flange.

In Fig. 4 is shown a head, C, in which the central countersink is deeper than the rim-flange, the object being to permit of the head-seams being soldered by simply standing the can upright in a bath of molten solder deep enough to cover the edges of the flange. The head is countersunk to prevent contact of the solder with its central portion. The inward curvature of the edges of the body centers the body within the heads, as it were, and permits of the heads being quickly and readily placed upon the bodies by hand or guiding-dies, and the seam is a very strong one to resist the bursting-pressure in the process-vats or blows or impacts from without, its strength being due to the fact that the surfaces united by the solder are other than plane or straight in any section.

The soldering of the seam is as conveniently done from the outside as in the ordinary seam, and much more conveniently done from the inside, as the edge is at a little distance from the walls, and the surfaces on either side contiguous to the seam incline toward it.

My invention is obviously equally applicable to the manufacture of other sheet-metal articles, such as cups or measures.

What I claim is—

As a new article of manufacture, a sheet-metal can having a body with a vertical portion, *d*, and inwardly-bent ends *c*, and provided with heads having outwardly-bent and vertical rim-flanges *a b*, the portion *a* fitting the ends *c*, and the vertical flange fitting outside the vertical portion *d* of the can-body, as set forth.

JOHN SOLTER.

Witnesses:
R. D. WILLIAMS,
J. P. PISTEL.